Dec. 25, 1951 J. H. HAMMOND, JR 2,580,020

VOLUME EXPANDER WITH TIMING CONTROL

Filed Jan. 6, 1948 2 SHEETS—SHEET 1

INVENTOR
JOHN HAYS HAMMOND, JR.
BY [signature]

INVENTOR
JOHN HAYS HAMMOND, JR.
BY N L Leek

Patented Dec. 25, 1951

2,580,020

UNITED STATES PATENT OFFICE 2,580,020

VOLUME EXPANDER WITH TIMING CONTROL

John Hays Hammond, Jr., Gloucester, Mass.

Application January 6, 1948, Serial No. 755

7 Claims. (Cl. 178—44)

This invention relates to volume expander circuits for record players and more particularly to a volume expander circuit having an automatic control for the timing of the build up and decay of the amplifier gain.

An object of the invention is to provide a system which automatically varies the timing of the change of the amplifier gain in accordance with the rhythm of the signal.

For the average symphonic reproduction the time constant of build up and decay of the amplifier gain should be relatively long while for speech and dance records the time constant should be relatively short. This timing may be manually controlled by changing the capacitance of the filtering and timing condensers or by changing the resistance value of the filtering circuit. However, change of resistance values disturbs the final value of the voltage that will represent the steady state condition, whereas capacitance changes do not disturb the voltage.

In order to change the timing by varying the capacitance it is necessary to use a capacitance range of the order of .05 microfarad to 2.0 microfarads in the expander timing circuit. It is not commercially practicable to produce such large changes in capacitance by electronic means. It is accordingly another object of the invention to provide a suitable control means responsive to the rhythm frequency for producing the necessary capacitance changes in the timing circuit.

Various other objects and advantages will be apparent as the nature of the invention is more fully disclosed.

In accordance with the present invention the signal is passed through a rhythm analyzer circuit including a low pass filter having an upper cut-off at a frequency of the order of 10 cycles per second. The analyzer is adapted to produce a direct voltage which is directly proportional to the rhythm frequency. This voltage is applied through a servo mechanism or a mechanical relay to control a switch which is adapted to connect individual condensers of a condenser bank successively in the expander timing circuit. The arrangement is such that an increase in rhythm frequency causes a decrease in capacity of the expander timing circuit which adapts the expander to respond more rapidly to the changes in volume level. On the other hand, a decrease in the rhythm frequency results in the introduction of more capacity into the timing circuit so as to cause the amplifier to respond less rapidly to changes in the volume level. The control is so selected that the amplifier is made to respond most effectively to the particular type of signal being reproduced.

Although the novel features which are characteristic of this invention are pointed out more particularly in the claims, the nature of the invention will be better understood by referring to the following description taken in connection with the accompanying drawings in which a specific embodiment thereof has been set forth for purposes of illustration.

Figure 1:
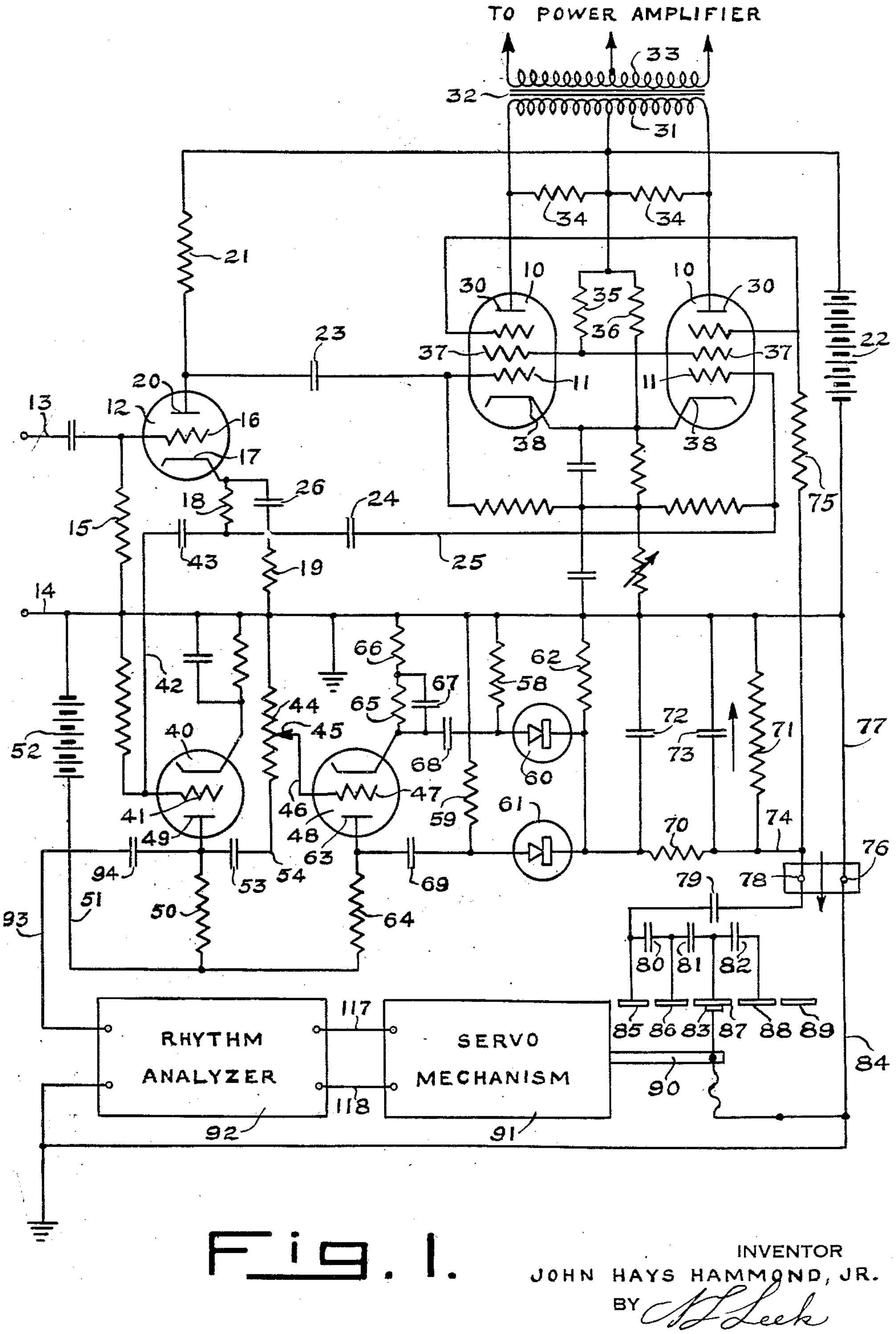
Fig. 1 is a schematic diagram of an expander circuit embodying the present invention.

Referring to the system shown in Fig. 1, the expander or dynamic multiplier stage is shown as comprising a pair of pentodes 10 having signal grids 11 which are driven in push-pull relationship from the output of a signal inverter tube 12. The signal inverter circuit is of the usual construction and includes signal input lines 13 and 14 which receive the signal from the pick-up device such as a phonograph pick-up of any desired type and apply the signal voltage across a resistor 15 to the input circuit of the tube 12 which includes a signal grid 16 and a cathode 17 which is connected through cathode resistors 18 and 19 to the ground lead 14. The tube 12 is provided with an anode 20 which is supplied through a resistor 21 from a potential source shown as a battery 22 and is connected through a blocking condenser 23 to the signal grid 11 of the first pentode 10. The junction of the resistors 18 and 19 is connected through a blocking condenser 24 and a lead 25 to the signal grid 11 of the second pentode 10. A condenser 26 by-passes the signals around the resistor 18. The arrangement is such that equal and opposite signals are applied to the signal grids 11 of the two pentodes for causing the latter to operate as a push-pull amplifier.

The anodes 30 of the pentodes 10 are connected to the outer terminals of the primary 31 of a push pull transformer 32 having a secondary 33 which is connected to a power amplifier not shown. The center tap of primary 31 is connected to the positive end of battery 22, and also through ballast resistors 34 to the anodes of the pentodes. The center tap is also connected to the second or screen grids 37 of the pentodes through screen resistor 35, and to the cathodes 38 by resistor 36. Suitable bias for the first grids 11 to which the signal is applied and for the third grids to which the expansion control voltage is applied is provided by resistors and capacitors connected from the cathodes 38 to ground line 14.

An amplifier tube 40 is provided with a signal grid 41 which is driven by the voltage across the resistor 19, which in turn constitutes the voltage applied to the signal grid 11 of the second pentode 10. For this purpose the signal grid 41 is connected by a lead 42 through a blocking condenser 43 to the junction of the resistors 18 and 19. The output of the amplifier tube 40 is fed to a potentiometer 44 having a variable tap 45 which is connected by a lead 46 to the control grid 47 of a rectifier driver tube 48. The anode 49 of the tube 40 is supplied with D. C. voltage through a resistor 50 and a lead 51 from a source shown as a battery 52, and is connected through a blocking condenser 53 and a lead 54 to the potentiometer 44.

The rectifier driver tube 48 is provided with an output circuit including resistors 58 and 59 and a pair of rectifiers 60 and 61 connected in push-pull relationship to produce a unidirectional voltage across a resistor 62.

The anode 63 of the tube 48 is supplied from the battery 52 through a resistor 64, and the cathode is connected to ground lead 14 through resistors 65 and 66 in series, one of which may be bypassed by capacitor 67. The cathode and anode of the tube 48 are connected to drive the rectifier system 58 to 62 by coupling condensers 68 and 69. Constants are suitably chosen so that the driving voltages for the two rectifiers are substantially equal but opposite in phase, and represent a suitable acoustical evaluation of the electrical signal at input 13 and 14. The output circuit of the rectifiers 60 and 61 is connected to a filter circuit comprising resistors 62, 70, 71 and capacitors 72, 73 to produce a unidirectional voltage across resistor 71 which is supplied by means of a lead 74 through a resistor 75 to the third grids of the pentodes 10, 10 so as to control the amplification of said pentodes in accordance with the signal level in a manner well known in expander circuits. The constants of the filter circuit including capacitors 72 and 73 are chosen for the most rapid rate of crescendo and decrescendo that may be desired when a signal is impressed and withdrawn from the input terminals. This may be a very rapid rate in view of the push pull type of rectification used.

For providing slower rates of operation, a connection block is provided with terminal 76 connected by line 77 to the ground end of condenser 73, and terminal 78 connected by line 74 to the other end which feeds the third grids of the pentodes with control voltage. The terminal 78 is connected to one end of capacitor 79, the capacitance of which when thrown in parallel with that of 73 determines the slowest rate of speed of expander action. The other end of condenser 79 is connected to a set of capacitors 80, 81, 82 in series. A sliding switch is provided with the movable contact 83 connected by line 84 to the grounded terminal 76, and with fixed elongated contacts 85, 86, 87, 88 and 89 across 85 to 88 of which capacitors 80 to 82 are connected, with no capacitor between contacts 88 and 89. This switch is of the shorting type so that at least one switch contact is always connected through the movable contact to ground.

When the movable contact 83 is on contact 87 as shown, the added capacitance across connection block 76, 78 is that due to capacitors 79, 80 and 81 in series. If it is moved to the right, the added capacitance is diminished and becomes zero when on contact 89. Or if it is moved to the left, the added capacitance increases and becomes that of capacitor 79 when on contact 85. Because of the shorting features, the capacitance is made to vary in steps without the added capacitance falling to zero. The response time of the dynamics of the expander therefore is made to be controlled by the motion of the switch contact.

The contact 83 is shown as actuated by an output link 90 of a servo mechanism 91 which is adapted to shift the contact successively across the contacts 85 to 89. The servo mechanism 91 is connected to be driven by the output of a rhythm analyzer 92 the input of which is connected by a lead 93 through a blocking condenser 94 to the anode 49 of the amplifier tube 40. The rhythm analyzer 92 and the servo mechanism 91 are adapted to drive the contact 83 in a direction to increase the total capacity in response to a decrease in the rhythm frequency and to decrease the total capacity in response to an increase in rhythm frequency. In this way the timing of the control voltage applied to the control grids of the pentodes 10 varies in accordance with the characteristics of the signal so as to produce the result above specified.

Figure 2:
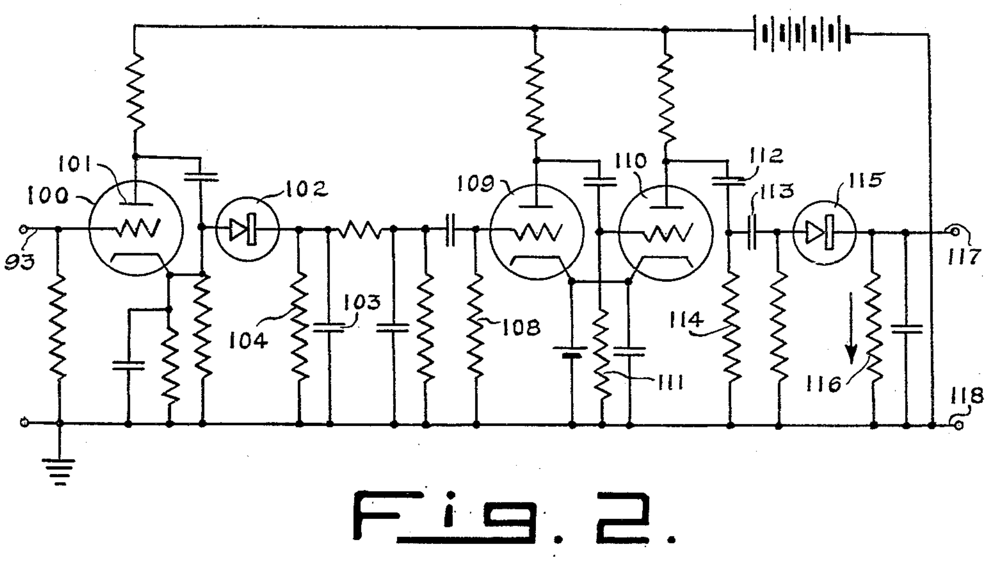
Fig. 2 is a schematic diagram of one type of rhythm analyzer to be used in the circuit of Fig. 1.

The rhythm analzyer 92 may have various characteristics and may be of any desired type. One embodiment is illustrated in Fig. 2 which shows an amplifier tube 100 driven by the signal received through the lead 93 from the amplifier tube 40 of Fig. 1. The amplifier tube 100 is provided with an output circuit including an anode 101 which is connected to a rectifier 102, operating into a low pass filter 103. The filter 103 may have an upper cut-off of for example 10 cycles and it may be of the R-C or L-R-C construction. In the embodiment shown the amplifier tube 100 is provided with the usual bias resistors and sources of voltage supply, and the rectifier 102 is connected to develop a unidirectional voltage across a resistor 104 which constitutes the input resistor to the filter circuit 103.

Inasmuch as the output of the filter 103 is dependent upon the strength of the signal as well as upon the frequency, the output is connected across a resistor 108 to a pair of amplifier limiter tubes 109 and 110 which are resistance-capacity coupled through a resistor 111 and are adapted to produce sufficient amplification so that the magnitude of the output of the tube 110 is independent of the input signal level to the filter 103 and the wave form is a function only of the frequency of the input signal. The amplifiers 109 and 110 are provided with the usual coupling and voltage supply circuits. The capacitances of the blocking condensers, the tubes and the plate and grid resistors are so chosen that the amplifier will operate satisfactorily down to below 1 cycle per second. A representative system has been shown merely for illustration. In certain instances a more complex type of amplifier may be required.

The fixed level output of the limiter tube 110 is fed through a tapered filter including capacitors 112, 113 and resistor 114 to a rectifier 115 which develops a unidirectional voltage across a resistor 116. This tapered filter is arranged to efficiently transmit rhythm frequencies of the highest value of say 10 cycles per second, and poorly transmit frequencies near or below 1 cycle per second. As the dynamic activity increases so that low subaudible frequency pulses are transmitted to the rectifier, the D. C. output increases roughly in proportion to the rhythm frequency and more or less independent of the signal volume. In case there is no dynamic activity and the sound level is being maintained fixed, there is no output voltage developed across resistor 116. It will be understood that for very weak signals, the limiter tube 110 may not be saturated, and the input to condenser 112 may be deficient. In general, however, an increased output of the rectifier corresponds to greater dynamic activity which makes a small timing capacitor desirable. The time constant of the output circuit of the final rectifier 115 must of course be relatively long so that the switching of the condensers will not be too rapid and erratic. The resistor 116 is connected to output leads 117 and 118 which in turn are connected to the input of the servo mechanism 91.

Figure 3:
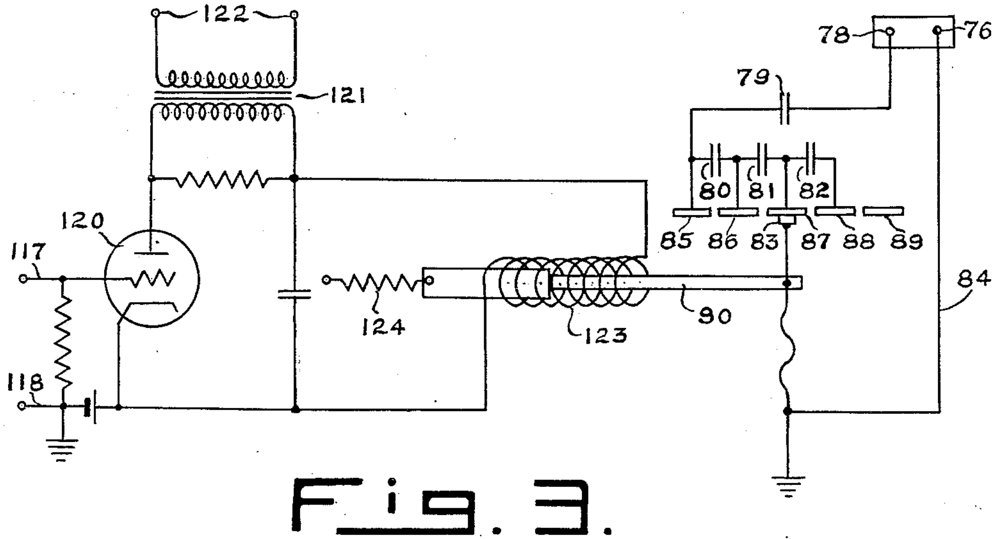
Fig. 3 is a schematic diagram of one type of servo control mechanism to be used in the circuit of Fig. 1.

The servo mechanism 91 may also be of any desired type. A representative type is shown in Fig. 3 as comprising a grid controlled rectifier 120 having an input circuit connected to the leads 117 and 118 and having a plate supplied through a transformer 121 from an A. C. supply line 122. The transformer 121 is connected to work into a solenoid 123 and is arranged so that the amount of rectified current depends upon the bias of the grid of the tube 120. The arrangement is such that for zero D. C. input from the rhythm analyzer 92 the rectified output current will be a minimum. This corresponds to the switch position for closing the contact 85. The solenoid 123 is connected to drive the link 90 and is retracted by a spring 124 so that with increased current through the solenoid 123 the link 90 and the movable contact 83 are shifted to the right whereas with a decreased current the spring 124 returns the contact 83 to the left.

In the operation of this system it will be noted that the input signal from the phonograph pick-up or the like is supplied to the amplifier tube 12 which is adapted to produce a push-pull signal which is supplied to the signal grids of the amplifier pentodes 10. The output of these pentodes is applied to the power amplifier and then to the speaker in the usual manner. The gain of the pentodes 10 is controlled by the voltage applied to the third grids thereof from the lead 74. This voltage is a function of the output of the push-pull rectifiers 60 and 61 which in turn are driven by the rectifier driver amplifier 48 and by the amplifier 40. The timing of the circuit including the filter network 70 to 73 is such that this voltage represents the average value of the signal level over a predetermined time period and the control period or the rate of change of the voltage across the resistor 71 is dependent upon the value of the capacitors connected across the condenser 73. Hence the rate of change of the control voltage in response to change of signal level is varied by the setting of the switch contact 83.

The signal which is supplied to the signal grid of one of the pentodes 10 is connected through the lead 42 to drive the amplifier 40 which in turn is connected through a condenser 94 and lead 93 to drive the rhythm analyzer 92.

The rhythm analyzer 92 in the form shown in Fig. 2 includes an amplifier 100 which further amplifies the signal and drives the rectifier 102 which in turn, through the low-pass filter 103, drives the amplifier tubes 109 and 110 which serve to eliminate fluctuations due to variations in signal level and to produce an output voltage across the resistor 116 which is a function of the rhythm frequency or the rate of change of signal level. This is applied through the leads 117 and 118 to the servo mechanism 91 which in the form shown in Fig. 3 includes a solenoid driven from a transformer 121 through a grid controlled rectifier 120 controlled in accordance with the output of the rhythm analyzer and adapted to shift the contact 84 as above specified.

It will be evident from the above that the system operates automatically to provide a timed expansion which is varied in accordance with the timing requirements of the signal being reproduced. The system is accordingly suited for the reproduction of a wide variety of signals from symphonic to speech and dance music and in each case produces the most desirable and pleasing characteristics.

Although a specific embodiment of the invention has been shown for purposes of illustration, it is to be understood that various changes and adaptations may be made therein and that the invention is only to be restricted in accordance with the scope of the following claims.

What is claimed is:

1. An expander system comprising an input circuit for supplying signals to be amplified and expanded in volume range, an amplifier stage connected to amplify said signals, a gain control circuit connected to said input circuit and having signal-responsive means, including a timing capacitance, responsive to the average volume level of the signal over a predetermined time period and connected to control the gain of said amplifier stage, variable timing means in said gain control circuit connected to control said time period, said variable timing means including a rhythm analyzer circuit including a low-pass filter network having an output voltage substantially directly proportional to frequency, said rhythm analyzer being connected to said input circuit and responsive to the rhythm frequency to develop a control voltage substantially directly proportional to said rhythm frequency, said timing means also including actuator elements responsive to said control voltage and connected to alter the timing capacitance in accordance with the rhythm frequency.

2. An expander system as set forth in claim 1 in which timing capacitance comprises a fixed capacitor and said actuating circuit is connected to vary the effective capacity of said capacitor.

3. An expander system as set forth in claim 1 in which said timing capacitance comprises a condenser bank having a plurality of contacts connected to the individual condensers of the bank, a movable contact is connected to selectably engage one of said plurality of contacts, and said actuator elements are connected to move said movable contact.

4. An expander system according to claim 3 in which said actuator elements include a servo member having mechanical means connected to actuate said movable contact.

5. An expander system according to claim 4 in which said servo mechanism comprises a solenoid which is energized by said control voltage.

6. An expander system according to claim 1 in which said rhythm analyzer comprises a low pass filter having a high frequency cut-off at about 10 cycles per second and which is connected to develop a control voltage proportional to the frequency passed by said filter.

7. An expander system as set forth in claim 6 in which a limiter amplifier stage is included with said low pass filter to substantially eliminate fluctuations in control voltage due to changes in rhythm intensity.

JOHN HAYS HAMMOND, Jr.

REFERENCES CITED

The following references are of record in the file of this patent:

UNITED STATES PATENTS

| Number | Name | Date |
|---|---|---|
| 1,979,035 | Hammond | Oct. 30, 1934 |
| 2,221,541 | Hathaway | Nov. 12, 1940 |
| 2,404,160 | Boucke | July 16, 1946 |
| 2,410,178 | Milasus | Oct. 29, 1946 |